J. M. WILT.
Corn-Cribs.
No. 148,271.
Patented March 3, 1874.
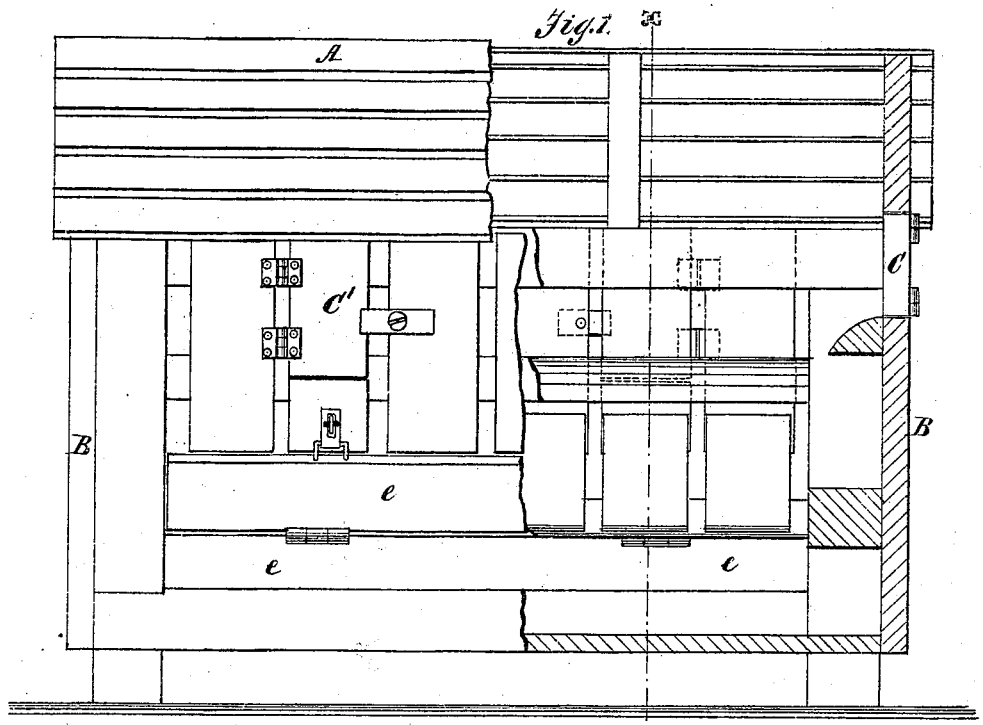
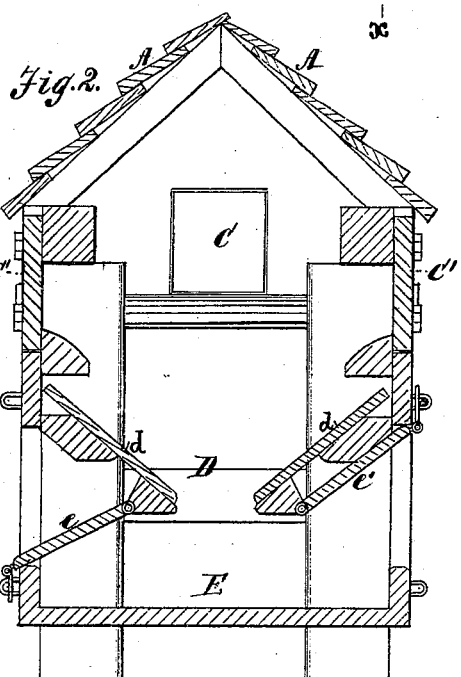
Witnesses:
G. Mathys
Solon C. Kemon
Inventor:
James Madison Wilt
Per
Attorneys.

UNITED STATES PATENT OFFICE.

JAMES M. WILT, OF LENOX, IOWA.

IMPROVEMENT IN CORN-CRIBS.

Specification forming part of Letters Patent No. 148,271, dated March 3, 1874; application filed May 14, 1873.

*To all whom it may concern:*

Be it known that I, JAMES M. WILT, of Lenox, in the county of Taylor and State of Iowa, have invented a new and Improved Corn-Crib; and I do hereby declare the following to be a full, clear, and exact description of the same, reference being had to the accompanying drawing forming part of this specification.

The nature of my invention relates to improvements in corn-cribs in which the corn may be stored, and which are provided with devices for automatically feeding the same to cattle or horses; and the invention consists in the arrangement near the lower part of the crib of inclined bottoms for deflecting the corn to a central opening between them in the central part of the crib, through which the ears of corn may fall to the central part of the floor of the crib below said opening, the width of the crib being such that the animal may have to extend its head and neck to reach the corn where discharged on said floor. Hinged doors are provided for opening and closing the openings through which the animals have access to the corn, all as hereinafter more fully set forth.

In the accompanying drawings, Figure 1 is a side elevation of my improved crib, partly broken away to show its interior. Fig. 2 is a sectional view on the line $x\ x$, Fig. 1.

Referring to the parts by letters, letters A A represent a roof of any suitable kind, and B the body of the structure, preferably slatted on the sides, and made with end doors C C and side doors C' C', through which the corn is to be inserted. These corn-cribs are intended to contain from one to five hundred bushels of corn, and to keep it secure from the weather from the time it is stored therein until it is desired to feed the same to the stock. d d are supplemental bottoms arranged longitudinally in the crib, and projecting diagonally downward and inwardly from the side walls toward the center of the crib, leaving an opening, D, between them. E is the lower floor of the crib. e e' are doors hinged at one side to the lower ends of the inclines d d, so that they may be turned down, as shown at e, to close the opening or access to the floor E, or turned upward, as shown at e', Fig. 2, to open the same. They are secured in either position by hooks and staples, in the obvious manner shown by Fig. 2 of the drawings.

The operation is as follows: The opening D is barely large enough to allow the passage of the corn through it when the corn below it is removed, and is close enough to the floor E to prevent the corn accumulating and spreading laterally on said floor. Its distance from the outer walls is also such that animals must necessarily extend the head and neck to reach the corn below the opening D, so that they will seize an ear in their mouth and have to step backward from the crib to eat it, thus preventing the stronger and heavier animals from keeping the smaller and weaker ones away from the corn, as is the case when the crib is arranged to discharge at the sides, where the cattle may stand and eat it from the crib. It will also be obvious that the position of the corn centrally on the floor E is such that animals cannot slabber over it, as is the case when they eat from the pile at the side of the crib, and, as is well known, the slabber, when frozen over the ears of corn, prevents the animals eating it.

When the animal is compelled to withdraw the ear and eat it on the ground, the hogs will gather up the scattered grain, and thus be fed with the cattle without waste.

What I claim as my invention is—

A corn-crib having the supplemental bottoms d d, with an opening, D, centrally within the crib and above the floor E, substantially as and for the purpose specified.

JAMES MADISON WILT.

Witnesses:
W. H. HAMILTON,
J. B. HARSH.